Patented Sept. 28, 1926.

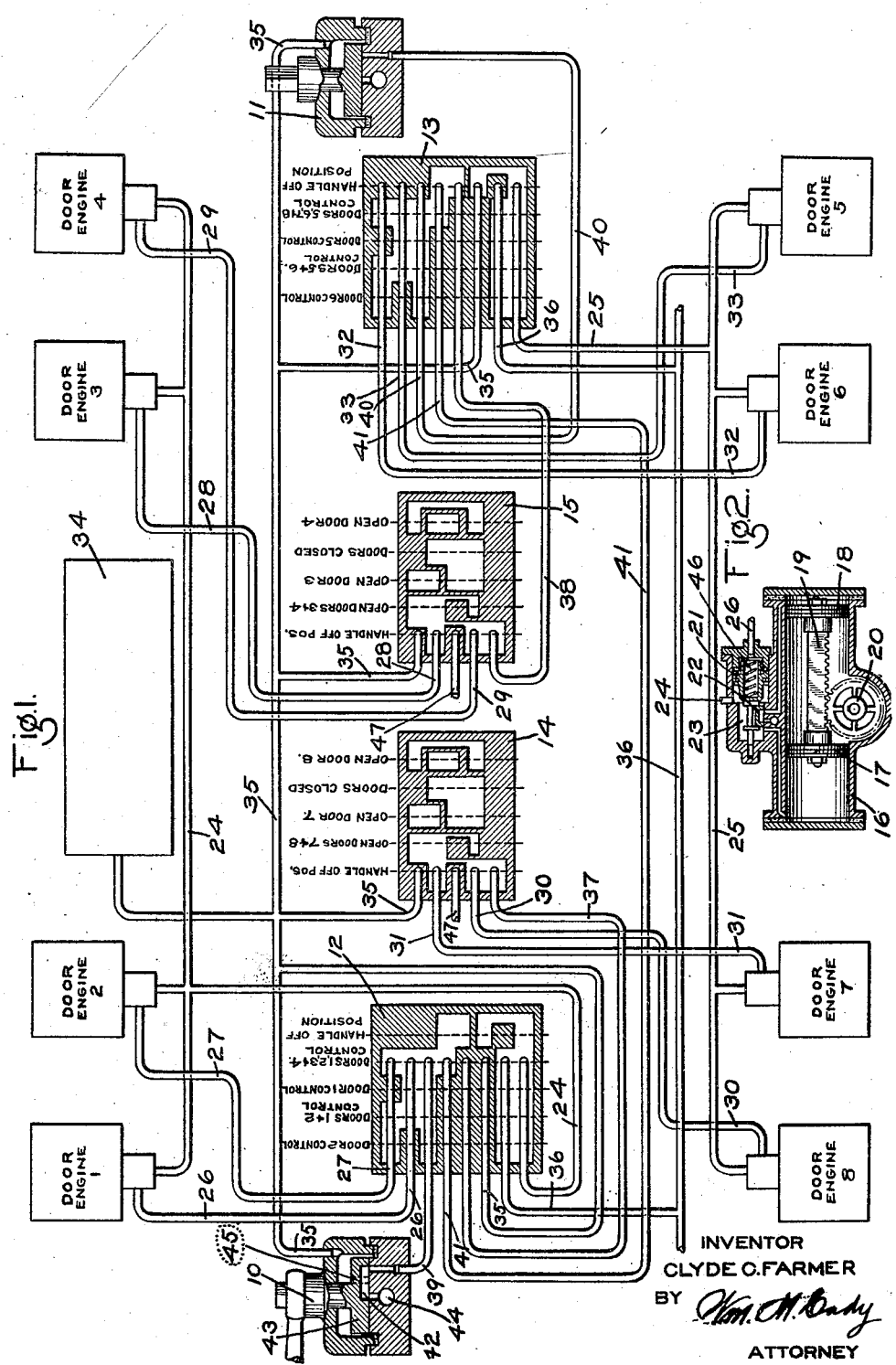

1,601,166

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

DOOR-CONTROLLING MECHANISM.

Application filed November 20, 1924. Serial No. 750,980.

This invention relates to car door controlling devices, and more particularly to a car door controlling apparatus for cars adapted to be operated either as one or two man cars.

The principal object of my invention is to provide an improved car door controlling equipment of the above character.

In the accompanying drawing; Fig. 1 is a diagrammatic view of a car door controlling equipment embodying my invention; and Fig. 2 a sectional view of one of the car door controlling engines.

The equipment shown in the drawing is adapted to control a plurality of car doors at each side of the car, for which the door engines 1 to 8 are provided, and for controlling the door engines, motorman's brake valve devices 10 and 11 are provided at opposite ends of the car and corresponding door selector valves 12 and 13. Conductor's door controlling valves 14 and 15 are provided, by the manipulation of which, the conductor may control certain car doors.

The door engines 1 to 8 may be constructed as shown in Fig. 2 and comprising a casing 16 containing pistons 17 and 18 connected by a piston stem 19 which is provided with a rack adapted to engage the teeth of a gear 20. The gear 20 is operatively connected to a car door, so that in the position shown in Fig. 2, the car door will be held closed and when the pistons 17 and 18 are shifted to the left, the car door will be opened.

For controlling the fluid pressure for operating the pistons 17 and 18, a valve device may be employed comprising a piston 21 and a valve 22 contained in valve chamber 23 and adapted to be operated by said piston. The valve chamber 23 is connected to one of the fluid pressure supply pipes 24 or 25 and the piston chamber at the opposite side of piston 21 is connected to one of the corresponding control pipes 26 to 33.

The motorman's brake valve devices 10 and 11 are adapted to control the fluid pressure brakes and the operation of the car doors, but it is deemed unnecessary to show the ports and passages for controlling the brakes.

In order to more clearly show the connections made in the different operating positions, the motorman's selector valve and the conductor's door controlling valve are shown diagrammatically.

The door control pipes 26 and 27 lead to the selector valve 12, pipes 32 and 33 to the selector valve 13, pipes 28 and 29 to the conductor's valve 15, and pipes 30 and 31 to the conductor's valve 14. The main reservoir 34 is connected to a main reservoir pipe 35, which leads to the valves 12, 13, 14, and 15 and to the rotary valve chamber of each of the motorman's brake valves and the usual emergency brake pipe 36 is connected to the selector valves 12 and 13.

The selector valve 12 and the conductor's valve 14 are connected by a pipe 37, and the selector valve 13 and conductor's valve 15 by pipe 38. The brake valve 10 is connected to selector valve 12 by pipe 39 and the brake valve 11 is connected to selector valve 13 by pipe 40. An interlocking pipe 41 connects the selector valve 12 with selector valve 13.

In operation, if the car is to be operated as a one man car, and assuming that the operating end is at the left of the drawing, the selector valve 13, the conductor's valves 14 and 15, and the motorman's brake valve 11 will be placed in handle off positions, as shown in the drawing. If the motorman desires to operate the car doors corresponding with door engines 1 to 4, he places the selector valve 12 in the position shown in the drawing.

With the brake valve 10 in release position, pipe 39 is connected through cavity 42 in rotary valve 43 with an exhaust port 44 and said pipe in the position above referred to registers with a cavity in the selector valve, which is connected to door control pipes 26 and 27, and to pipe 41. Pipe 41 is connected in the handle off position of selector valve 13 with pipe 38, leading to conductor's valve 15 and in handle off position of said conductor's valve the pipe 38 is connected to door control pipes 28 and 29. It will thus be seen that the control pipes 26 to 29 are now connected to pipe 39, and that with the brake valve 10 in door closing position, the pistons 21 of the door engines 1 to 4 are connected to the atmosphere, so that the door engine controlling valve device will be in the door closing position, in which piston 18 is connected to the atmosphere, through slide valve 22, while piston 17 is supplied with fluid under pressure from valve chamber 23 and pipe 24. Pipe 24 is now connected, through a cavity in selector valve 12 with emergency brake pipe 36, so that the pistons 17 of the door engines 1 to 4 are maintained in door closing position by fluid under pressure supplied from the emergency brake pipe.

If the motorman desires to open the car doors, he moves the brake valve 10 to the door open position, in which a port 45 in the rotary valve 43, registers with pipe 39. Fluid under pressure is then supplied to piston 21 of each door engine 1 to 4 and aided by spring 46, the piston is shifted to the door open position, in which slide valve 22 connects the piston chamber of piston 17 with the atmosphere and the piston chamber of piston 18 is supplied with fluid under pressure. The pistons 12 and 18 are thereupon shifted to the door opening position.

If the motorman wishes to operate only the door engine 1, the selector valve 12 is placed in the door 1 control position, in which only the control pipe 26 of the door engine 1 is connected to the pipe 39, so that when the brake valve 10 is operated only the door 1 will be opened and closed. Similarly, only the door engine 2 will be operated in the door 2 control position, while in the doors 1 and 2 control position, the door engines 1 and 2 will be operated.

If a reduction in pressure in the emergency brake pipe 36 is effected to cause an emergency application of the brakes, or by reason of a broken pipe, the door engines 1 to 4 on the operating side of the car will be balanced as to fluid pressure, since the emergency brake pipe pressure is exhausted from the pistons 17, thus permitting the doors 1 to 4 to be opened manually, if desired.

On the non-operating side of the car, however, the supply pipe 25 is connected through a cavity in the selector valve 13 with main reservoir pipe 35, so that the doors 5 to 8 will be held in door closed position, even though the emergency brake pipe pressure is reduced.

If the car is to be operated with two men, the conductor may control the rear doors operated by door engines 3 and 4 by manipulation of the conductor's valve 15, assuming that the car is being operated at the left hand end.

By moving the conductor's valve to the position for opening doors 3 and 4, the door control pipes 28 and 29 are connected through a cavity in the valve with main reservoir pipe 35, so that fluid under pressure is supplied to the pistons 21 of the door engines 3 and 4. The valve 22 is then shifted to the left, so that piston 17 is vented to the atmosphere and fluid under pressure is supplied to piston 18. Pistons 17 and 18 are thereupon shifted to the position for opening the corresponding car doors.

If the conductor wishes to open only the door 3, he moves the conductor's valve to open door 3 position, in which the control pipe 28 is connected to the main reservoir pipe 35 while the control pipe 29 of door engine 4 is connected to an exhaust pipe 47. The door engine 3 will thus be operated to open the corresponding door, while the door engine 4 will be held in door closing position.

Similarly, in open door 4 position fluid is supplied to door engine 4 to operate the door engine for opening the corresponding door, while fluid is vented from the controlling valve piston 21 of door engine 4, so that the door 4 will be held in closed position.

In door's closed position, which is the normal position of the conductor's valve, when the car is being controlled by two men, both of the door control pipes 28 and 29 are connected to the exhaust pipe 47, so that both of the car door engines 3 and 4 are held in the door closing position.

In the door closing position of the conductor's valve, the control pipes 28 and 29 are cut off from the selector valve 12 at the operating end of the car, so that the motorman cannot operate the rear doors.

By connecting the control pipe for the rear doors through the selector valve at the non-operating end, the door engines at the non-operating side of the car are never connected so as to permit the possible opening of the car doors at the non-operating side of the car.

Having now described my invention, what I claim as new and desire to secure by Letters Patent, is:

1. In a car door controlling equipment, the combination with a door engine, of a door engine controlling valve, a door selector valve at each end of the car, and an additional door engine controlling valve, said door engine being operatively connected to the door engine controlling valve through the additional door engine controlling valve and both selector valves.

2. In a car door controlling equipment, the combination with a door engine, of a door engine controlling valve, a door selector valve at each end of the car, and an additional door engine controlling valve, said additional door engine controlling valve and said selector valves having positions in which communication is established from said door engine through said additional door engine controlling valve and both door selector valves to said door engine controlling valve.

3. In a car door controlling equipment, the combination with a door engine, of a motorman's door engine controlling valve, a door selector valve at each end of the car having operating positions and a non-operating position, a conductor's door engine controlling valve having operating positions and a non-operating position, said door engine being operatively connected to the motorman's door engine controlling valve in the non-operating position of the conductor's door engine controlling valve, the non-operating position of one selector valve, and an operating position of the other selector valve.

4. In a car door controlling equipment, the combination with a plurality of door engines, of a motorman's door controlling valve, a door selector valve for establishing communication from one door engine to said door controlling valve, a conductor's controlling valve for controlling another door engine and having a position for establishing communication from the second mentioned door engine to the selector valve, said selector valve having a position for establishing communication from the conductor's valve to the motorman's door controlling valve.

5. In a car door controlling equipment, the combination with a door engine, an emergency brake pipe, and a source of fluid under pressure, of a valve having one position for connecting said door engine to the emergency brake pipe and another position in which said door engine is connected to said source of fluid under pressure.

6. In a car door controlling equipment, the combination with a door engine, an emergency brake pipe, and a source of fluid under pressure, of a door selector valve having operating positions in which said door engine is connected to the emergency brake pipe and a non-operating position in which said door engine is connected to said source of fluid under pressure.

7. In a car door controlling equipment, the combination with a door engine, a motorman's door controlling valve, a door selector valve, and a conductor's door controlling valve having operating positions for controlling said door engine and a non-operating position in which said door engine is connected to said selector valve, said selector valve having a position in which said door engine is connected through the conductor's valve with said motorman's valve.

In testimony whereof I have hereunto set my hand.

CLYDE C. FARMER.